US005678213A

United States Patent [19]

Myer

[11] Patent Number: 5,678,213

[45] Date of Patent: Oct. 14, 1997

[54] RADIO RECEIVER FOR PROCESSING A MULTI-CARRIER SIGNAL WITH A LARGE DYNAMIC RANGE

[75] Inventor: Robert Evan Myer, Denville, N.J.

[73] Assignee: Lucent Technologies Inc., Murray Hill, N.J.

[21] Appl. No.: 316,288

[22] Filed: Sep. 30, 1994

[51] Int. Cl.[6] .......... H04B 1/10

[52] U.S. Cl. .......... 455/209; 455/295; 455/303; 455/306; 455/314

[58] Field of Search .......... 375/216, 346, 375/348, 349, 350; 327/310, 312, 551; 455/303, 310, 209, 295, 314, 306; 370/32

[56] References Cited

U.S. PATENT DOCUMENTS

| | | | |
|---|---|---|---|
| 3,611,169 | 10/1971 | Hess et al. | 329/135 |
| 4,166,251 | 8/1979 | Ishigaki | 329/132 |
| 4,246,541 | 1/1981 | Ishigaki | 329/132 |
| 4,349,916 | 9/1982 | Roeder | 375/103 |
| 4,739,518 | 4/1988 | Bickley et al. | 455/296 |
| 4,777,449 | 10/1988 | O'Connor | 455/209 |
| 4,991,165 | 2/1991 | Cronyn | 370/32 |
| 5,222,106 | 6/1993 | Satoh et al. | 375/102 |
| 5,313,169 | 5/1994 | Fouche et al. | 375/376 |
| 5,430,893 | 7/1995 | Myer | 455/209 |

*Primary Examiner*—Wellington Chin
*Assistant Examiner*—Jean B. Corrielus
*Attorney, Agent, or Firm*—Jason P. DeMont; Jimmy Goo

[57] ABSTRACT

A radio receiver front end is disclosed that processes a multi-carrier signal with a large dynamic range. An illustrative embodiment of the present invention incorporates both feedforward and feedback mechanisms to suppress the amplitude of spurious carrier signals so as to prevent those signals from flooding the dynamic range of the mixer that mixes down the multi-carrier signal.

16 Claims, 2 Drawing Sheets

RADIO RECEIVER FOR PROCESSING A MULTI-CARRIER SIGNAL WITH A LARGE DYNAMIC RANGE

FIELD OF THE INVENTION

The present invention relates to electric circuit design in general, and more particularly, to an improved radio front end that is well-suited for processing multi-carrier signals with a large dynamic range.

BACKGROUND OF THE INVENTION

FIG. 1 depicts a schematic diagram of the front-end of a typical radio receiver in the prior art. A variety of signals on different carriers, usually from different sources in different frequency bands, arrive at antenna 101 and are filtered by bandpass filter 105, which has a relatively wide passband. In a common AM radio, for example, this filtered signal spans a finite frequency range and comprises multiple carrier signals. For this reason, the signal is often referred to as a multi-carrier signal.

The purpose of bandpass filter 105 is to suppress all carrier signals that are outside the frequency range of interest and only pass those carrier signals that are within the frequency range. Low noise amplifier 107, typically a class-A amplifier, amplifies the multi-carrier signal so as to fully exploit the available dynamic range of mixer 117. Mixer 117 uses a periodic signal generated by local oscillator 125 to mix-down the multi-carrier signal such that the desired carrier signal passes through bandpass filter 119, which has a relatively narrow passband. Local oscillator 125 is usually a variable frequency oscillator, which is advantageous in that it permits the radio to be tuned by adjusting the frequency of local oscillator 125.

The advantage of bandpass filter 105 is that it reduces the number of carrier signals that are processed by mixer 117, and thus, statistically, reduces the dynamic range requirement of mixer 117. If the dynamic range of the multi-carrier signal is larger than the dynamic range capability of mixer 117, the mixing process produces intermodulation products that can interfere with the respective carrier signals. Typically, the fact that mixers have a finite dynamic range is the factor that most limits the quality of radio reception. The prior art is contains many techniques for building extended dynamic range mixers.

SUMMARY OF THE INVENTION

A radio receiver front end is disclosed that processes a multi-carrier signal with a large dynamic range. An illustrative embodiment of the present invention incorporates both feedforward and feedback mechanisms to suppress the amplitude of spurious carrier signals so as to prevent those signals from flooding the dynamic range of the mixer that mixes down the multi-carrier signal.

An illustrative embodiment of the present invention incorporates both feedforward and feedback mechanisms to suppress the amplitude of spurious carrier signals so as to prevent those signals from flooding the dynamic range of the mixer.

DETAILED DESCRIPTION

Figure 1:
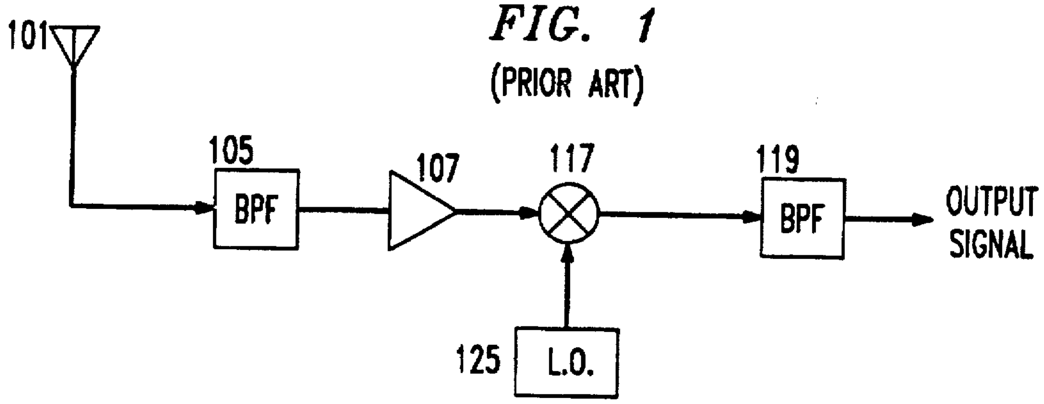
FIG. 1 depicts a schematic diagram of a radio receiver front-end in the prior art.
Figure 2:
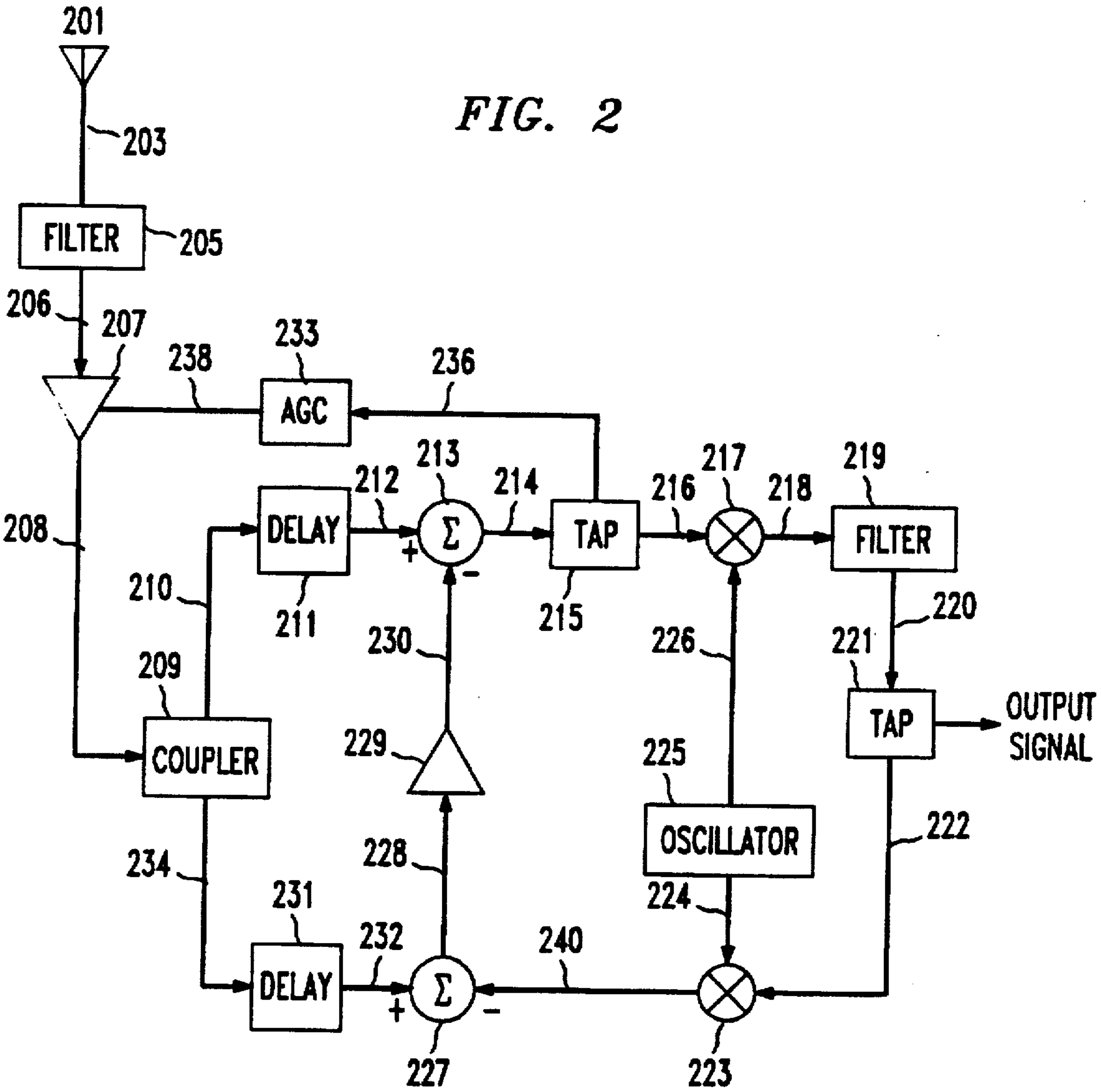
FIG. 2 depicts a schematic diagram of an illustrative embodiment of the present invention.
Figure 3:
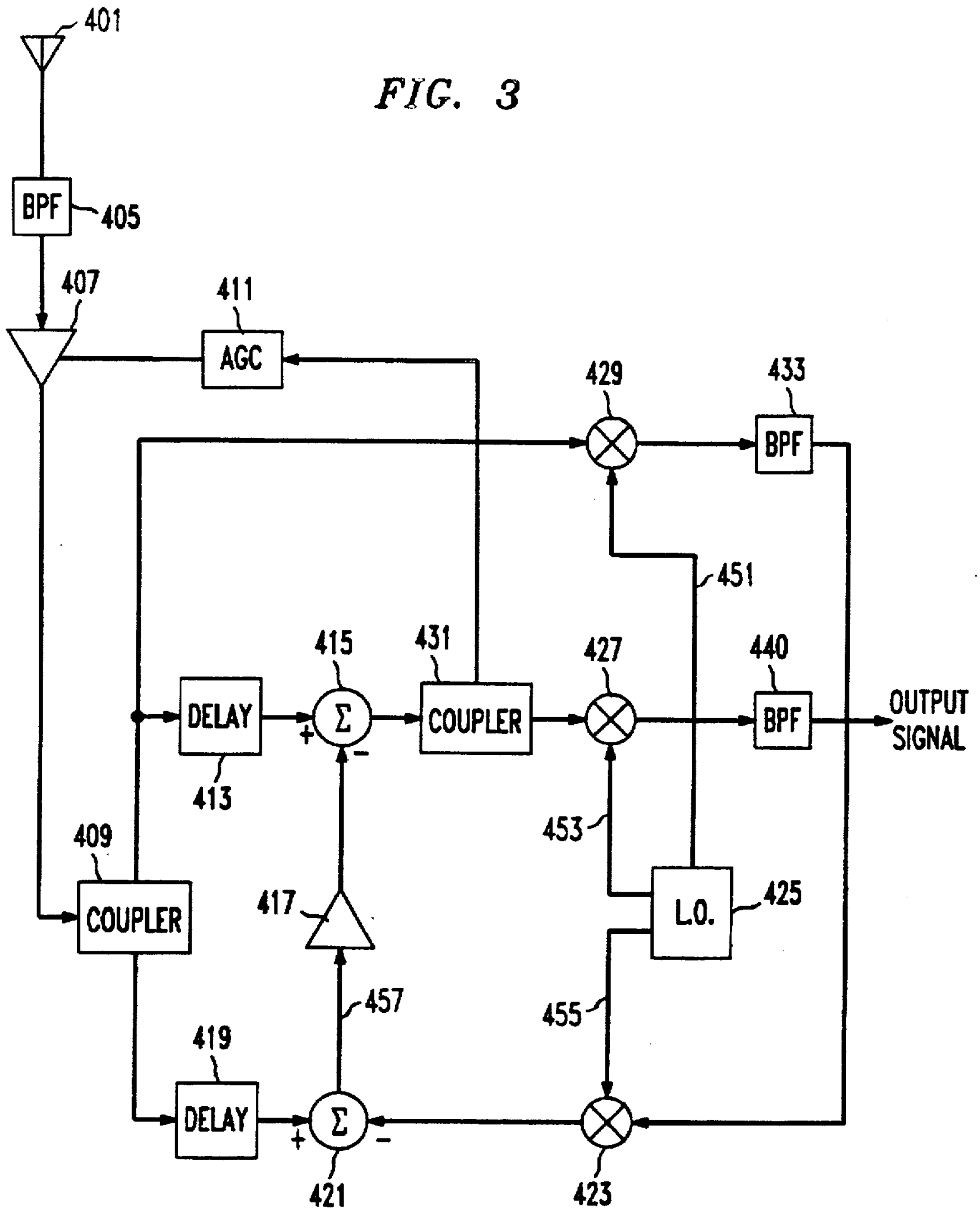
FIG. 3 depicts a schematic diagram of a second illustrative embodiment of the present invention.

Two illustrative embodiments of the present invention are described: one in FIG. 2 and the other in FIG. 3. The embodiment in FIG. 2 can be fabricated less expensively and with fewer components than the embodiment in FIG. 3, but the embodiment in FIG. 3 is advantageous in that is absolutely stable and has less loss.

FIG. 2 depicts a schematic diagram of an illustrative embodiment of the present invention that is particularly well-suited for cellular communications systems and other commercial radio receivers. The radio receiver front-ends depicted in both FIG. 2 and FIG. 3 process a multi-carrier signal comprising a plurality, P, of carrier signals, each of which is individually situated in one of a plurality, P, of distinct frequency bands. The frequency bands are not necessarily of the same width nor are they necessarily contiguous. All of the frequency bands are defined to be within a frequency range R. The ultimate function of each of the illustrative embodiments is to separate and output whichever carrier signal is desired from the input signal while suppressing the other spurious signals and without introducing intermodulation products into the desired carrier signal.

For radio systems that comply with the American Mobile Phone Service analog standard or the IS-54 TDMA standard, each frequency band has a nominal width of 30 KHz. For radio systems that comply with the IS-95 CDMA standard, each frequency band has a nominal width of 1.25 MHz.

The First Illustrative Embodiment

Referring again to FIG. 2, a radio signal is received by antenna 201 and passed through filter 205 to form an input signal. Filter 205, which advantageously is a bandpass filter with a passband of width R. Antenna 201 and filter 205 can be selected from well-known components and will not be elaborated on further.

From filter 205, the input signal passes to amplifier 207, which preferably amplifies the input signal to take full advantage of the dynamic range of mixer 217. The output of amplifier 207 is the multi-carrier signal. Amplifier 207 is preferably a low noise class-A amplifier, the gain of which may advantageously controlled by automatic gain control circuitry 233.

From amplifier 207, the multi-carrier signal is coupled by coupler 209 and fed through delay 211 and delay 231 into summer 213 and summer 227, respectively. The multi-carrier signal fed through delay 231 and into summer 227 forms the basis of a feed-forward loop and may be called the feedforward signal. The multi-carrier signal may be split in various ways (e.g., preferably by coupler 209). Coupler 209 can be implemented using a Wilkinson coupler, a Hybrid coupler or any one of many other standard devices that perform the same functionality.

It is the preferred function of both summer 213 and summer 227 to effectively form the vector difference of its input signals. Summer 213 and 227 can each be fabricated from a summing amplifier (if the relative phases of the input signals are adjusted to be 180° out of phase) or with a difference amplifier, or with any other standard technique which performs the same functionality (e.g., Wilkinson couplers, Hybrid couplers).

The multi-carrier signal on lead 210 passes through delay 211 and to summer 213, which subtracts a suppression signal on lead 230 from the multi-carrier signal on lead 212 to form a feedback signal on lead 214. The feedback signal forms the basis for both the output signal and a signal that feeds back into summer 227. In this way, the embodiment comprises both feedforward and feedback loops that are integrated. The length of delay 211 is preferably set so that the delay through coupler 209 and delay 211 is equal to the delay through coupler 209, delay 231, summer 227 and amplifier 229, thus causing the suppression signal to cancel a broadband set of frequency components in the multi-carrier signal not related to the desired output signal.

By using a combination of feed-forward and feedback, embodiments of the present invention can reduce the dynamic range of the signal entering the mixer, which has the advantage of mitigating the possibility of intermodulation products. It is possible to reduce the dynamic range of this signal by 10 dB, 20 dB, 30 dB or more.

Tap 215 advantageously samples the feedback signal emanating from summer 213 and feeds the sample to automatic gain control 233, which in turn controls the gain of amplifier 207. Tap 215 and automatic gain control 233 can be selected from standard devices.

Mixer 217 takes the feedback signal from summer 213, and with the first oscillatory signal on lead 226, mixes down the feedback signal to create a mixed-down signal. Mixer 217 preferably has a large dynamic range and can be selected from standard components. The first oscillatory signal is preferably created by oscillator 225. The mixed-down signal is passed to filter 219.

Filter 219 is preferably a narrowband bandpass filter that isolates the desired carrier signal from the mixed-down signal. For embodiments that comply with the American Mobile Phone Service analog cellular telephony standard or the IS-54 TDMA standard, filter 219 preferably has a nominal width of 30 KHz. For embodiments that comply with the IS-95 CDMA standard, filter 219 preferably has a nominal width of 1.25 MHz.

The output of filter 219 represents the output of the embodiment and can be sampled by tap 221, for use by the remainder of the radio receiver. The output of filter 219 is preferably fed into mixer 223 to create a mixed-up signal. Mixer 223, with a second oscillatory signal on lead 225, preferably mixes-up the output signal to the frequency range the output signal was at before it was mixed-down by mixer 217. It is preferred that the first oscillatory signal on lead 226 and the second oscillatory signal on lead 224 have the same frequency and it is further preferred that they also be identical. Mixer 223 is preferably selected to exhibit the same electrical characteristics as mixer 217.

The multi-carrier signal going through delay 231 and into summer 227 forms the basis for the feed-forward loop in the embodiment. Summer 227 takes the feed-forward signal on lead 232 and creates the suppression signal on lead 228 by forming the vector difference of the feed-forward signal minus the mixed-up signal. Advantageously, the suppression signal resembles the multi-carrier signal except that the frequency components representing the filtered signal are suppressed.

Because it is preferred that the amplitude of the suppression signal equals the amplitude of the multi-carrier signal as they enter summer 213, the suppression signal in various embodiments, it may be advantageous to amplify or attenuate the suppression signal with amplifier 229. The gain of amplifier 229 can be fixed or variable depending on various factors that will be clear to those skilled in the art.

The Second Illustrative Embodiment

Referring now to the second illustrative embodiment, unless otherwise stated each component described below preferably has the same physical properties and functionality as the corresponding component described above, except where specifically stated.

As shown in FIG. 3, a radio signal is received by antenna 401 and passed through filter 405 to form an input signal. Filter 405 is advantageously a bandpass filter with a passband of nominal width R. Antenna 401 and filter 405 can be selected from well-known components and will not be elaborated on further.

From filter 405, the multi-carrier signal passes to amplifier 407, which preferably amplifies the input signal to take full advantage of the dynamic range of mixer 427. The output of amplifier 407 is the multi-carrier signal. Amplifier 407 is preferably a low noise class-A amplifier, the gain of which may be advantageously controlled by automatic gain control circuitry 411.

From amplifier 407, the multi-carrier signal may be split in various ways (e.g., preferably by coupler 409) and is then fed into mixer 429, which with the first oscillatory signal on lead 451, mixes down the multi-carrier signal to create a mixed-down signal. The mixed-down signal forms the basis of the feedback loop in the embodiment. The first oscillatory signal is preferably created by oscillator 425. The mixed-down signal is passed to filter 433 where filter 433 preferably isolates the desired carrier signal to form a filtered signal.

Filter 433, as well as filter 440, are each preferably bandpass filters that isolate the desired carrier signal from the spurious signals in the mixed-down signal. For embodiments that comply with the American Mobile Phone Service analog cellular telephony standard or the IS-54 TDMA standard, filter 433 and filter 440 preferably have a nominal width of 30 KHz. For embodiments that comply with the IS-95 CDMA standard, filter 433 and filter 440 preferably have a nominal width of 1.25 MHz.

The output of filter 433 is preferably fed into mixer 423 to create a mixed-up signal. Mixer 423, with a second oscillatory signal on lead 455, preferably mixes-up the output signal to the frequency range the output signal was at before it was mixed-down by mixer 429. It is preferred that the first oscillatory signal on lead 451 and the second oscillatory signal on lead 455 have the same frequency, and it is further preferred that they also be identical. Mixer 423 is preferably selected to exhibit the same electrical characteristics as mixer 429 and mixer 427.

From mixer 423, the mixed-up signal is fed into summer 421 where summer 421 forms the suppression signal by forming the vector difference of the multi-carrier signal minus the mixed-up signal. The multi-carrier signal that passes through delay 419 and into summer 421 forms the basis for the feed-forward loop in the embodiment. The length of delay 419 is preferably equal to the delay through mixer 429, filter 433, and mixer 423. In other words, delay 419 and summer 421 are preferably fabricated so that the suppression signal resembles, as closely as possible, the multi-carrier signal entering summer 415 except that the frequency components representing the filtered signal are suppressed.

The multi-carrier signal passes through delay 413 and to summer 415 where summer 415 forms a difference signal by forming the vector difference of the multi-carrier signal minus the suppression signal. The length of delay 413 is preferably set so that the delay through coupler 409, delay 419, summer 421 and amplifier 417 is equal to the delay through coupler 409 and delay 413, thus causing the suppression signal to cancel a broadband set of frequency components in the multi-carrier signal not related to the desired output signal.

By using a combination of feed-forward and feedback, embodiments of the present invention can reduce the dynamic range of the signal entering the mixer, which has the advantage of mitigating the possibility of intermodulation products. It is possible to reduce the dynamic range of this signal by 10 dB, 20 dB, 30 dB or more. Furthermore, in embodiments of the present invention the unwanted carrier signals are suppressed by at least 20 dB.

Tap 431 advantageously samples the feedback signal emanating from summer 415 and feeds the sample to automatic gain control 411, which in turn controls the gain of amplifier 407. Tap 431 and automatic gain control 411 can be selected from standard devices.

Mixer 427 takes the difference signal from summer 415, and with the third oscillatory signal on lead 453, mixes down the difference signal to create the output signal. Mixer 427 preferably has a large dynamic range and can be selected from standard components. The third oscillatory signal is preferably created by oscillator 425. The third oscillatory signal on lead 453 preferably has the same frequency as the first oscillatory signal and the second oscillatory signal, and further preferably is identical to them. The output signal is passed through filter 440 where filter 440 preferably isolates the desired carrier signal from the output signal.

Filter 440 is preferably a narrowband bandpass filter that isolates the desired carrier signal from the mixed-down signal. For embodiments that comply with the American Mobile Phone Service analog cellular telephony standard or the IS-54 TDMA standard, filter 440 preferably has a nominal width of 30 KHz. For embodiments that comply with the IS-95 CDMA standard, filter 440 preferably has a nominal width of 1.25 MHz.

Embodiments of the present invention can work well even when the multi-carrier signal comprises a combination of amplitude modulated (AM), frequency modulated (FM) and spread-spectrum modulated signals.

The following are hereby incorporated by reference as if set forth in their entirety: (1) co-pending U.S. patent application Ser. No. 08/105082, filed Aug. 11, 1993; (2) *Electronic Circuits, Discrete and Integrated,* 2nd Ed., by D. L. Schilling and C. Belove, McGraw-Hill Book Company (1979); (3) *The Art of Electronics*, by P. Horowitz and W. Hill, Cambridge University Press (1980); (4) *Principles of Electrical Engineering*, V. Del Toro, Prentice-Hall (1972); (5) *Electronic Fundamentals and Applications for Engineers and Scientists*, J. Millman and C. Halkias, McGraw-Hill Book Company (1976); (6) *Reference Manaul for Telecommunications Engineering,* 2nd Ed., Roger L. Freeman, John Wiley & Sons, Inc. (1991); (7) *Communications Standard Dictionary,* 2nd Ed. Martin H. Weik, Van Nostrand Reinhold (1989); (8) *Reference Data for Radio Engineers,* 4th Ed., International Telephone and Telegraph Corp., (1956); (9) *Transmission Systems for Communication,* 5th Ed., AT&T Bell Laboratories, Inc. (1982); and (10) *Newnes Practical RF Handbook*, I. Hickman, B. H. Newnes (1993).

What is claimed is:

1. A method for processing a multi-carrier signal comprising a plurality of carriers, said method comprising:

splitting said multi-carrier signal to create a first signal and a second signal, such that said first signal and said second signal are each substantial analog representations of said multi-carrier signal;

mixing down said first signal with a first oscillatory signal to create a mixed-down signal;

filtering said mixed-down signal to suppress at least a portion of said mixed down signal to create a filtered signal;

mixing-up said filtered signal with a second oscillatory signal to create a mixed-up signal;

forming a suppression signal based on the vector difference of said second signal minus said mixed-up signal;

forming a difference signal based on the vector difference of a delayed first signal minus said suppression signal; and mixing down said difference signal based on a third oscillatory signal to create an output signal.

2. The method of claim 1 further comprising the step of filtering said output signal.

3. The method of claim 2 wherein said steps of filtering said mixed-down signal and filtering said output signal utilize bandpass filters.

4. The method of claim 3 wherein said bandpass filters have passbands of 30 KHz.

5. The method of claim 3 wherein said bandpass filters have passbands of 1.25 MHz.

6. The method of claim 1 wherein said first oscillatory signal, said second oscillatory signal and said third oscillatory signal have substantially the same frequency.

7. The method of claim 6 wherein said first oscillatory signal, said second oscillatory signal and said third oscillatory signal are identical.

8. The method of claim 1 further comprising the step of amplifying said suppression signal.

9. The method of claim 1 wherein the unwanted carrier signals are suppressed by at least 20 dB.

10. An apparatus for processing a multi-carrier signal, said apparatus comprising:

a first mixer for mixing down said multi-carrier signal with a first oscillatory signal to create a mixed-down signal;

a second mixer for mixing up said mixed-down signal with a second oscillatory signal to create a mixed-up signal;

means for forming a suppression signal based on the vector difference of said multi-carrier signal minus said mixed-up signal;

means for forming a modified signal based on the vector difference of said multi-carrier signal minus said suppression signal; and a third mixer for mixing down said modified signal with a third oscillatory signal to produce an output signal.

11. The apparatus of claim 10 further comprising:

a first bandpass filter for filtering said mixed-down signal; and a second bandpass filter for filtering said output signal.

12. The apparatus of claim 11 wherein said first bandpass filter and said second bandpass filter each have a passband of 25 KHz.

13. The apparatus of claim 12 wherein said first bandpass filter and said second bandpass filter each have a passband of 1.25 MHz.

14. The apparatus of claim 10 further comprising an oscillator for creating said first oscillatory signal, said second oscillatory signal and said third oscillatory signal.

15. The apparatus of claim 10 wherein said first oscillatory signal, said second oscillatory signal and said third oscillatory signal each have the same frequency.

16. The apparatus of claim 15 wherein said first oscillatory signal, said second oscillatory signal and said third oscillatory signal are identical.

* * * * *